United States Patent
Wakefield

[11] Patent Number: 5,358,267
[45] Date of Patent: Oct. 25, 1994

[54] DETACHABLE LEG SHIELD

[76] Inventor: Stella O. Wakefield, 524 Beatrice Dr., Dayton, Ohio 45404

[21] Appl. No.: 155,427
[22] Filed: Nov. 19, 1993
[51] Int. Cl.⁵ .............................................. B62J 27/00
[52] U.S. Cl. .................................. 280/304.3; 280/293
[58] Field of Search .................. 280/288.4, 293, 304.3, 280/304.4, 748, 755, 756, 298, 301

[56] References Cited

U.S. PATENT DOCUMENTS

| | | | |
|---|---|---|---|
| 4,022,488 | 5/1977 | Likas | 280/289 |
| 4,377,295 | 3/1983 | Lemman | 280/293 |
| 4,536,005 | 8/1985 | Tanaka et al. | 280/289 |
| 4,650,204 | 3/1987 | Bothwell | 280/289 |
| 4,655,497 | 4/1987 | Mallett | 280/289 |
| 4,673,190 | 6/1987 | Ahlberg | 280/304.3 |
| 5,106,136 | 4/1992 | Crain | 293/105 |
| 5,257,671 | 11/1993 | Watkins | 280/755 X |

FOREIGN PATENT DOCUMENTS

| | | | |
|---|---|---|---|
| 2744838 | 4/1979 | Fed. Rep. of Germany | 280/304.4 |
| 270783 | 1/1930 | Italy | 280/304.3 |
| 294546 | 2/1954 | Switzerland | 280/304.3 |

*Primary Examiner*—Richard M. Camby
*Assistant Examiner*—Kevin Hurley
*Attorney, Agent, or Firm*—R. William Graham

[57] ABSTRACT

The present invention is directed to a bicycle leg shield which includes a pair of side frames detachably hingedly mounted to the bicycle frame.

13 Claims, 2 Drawing Sheets

DETACHABLE LEG SHIELD

FIELD OF THE INVENTION

This invention relates to bicycles, scooters, mopeds, motorcycles or other two-wheeled vehicles which are referred to herein generically as a "bike".

BACKGROUND OF THE INVENTION

Not infrequently a rider of a bike is confronted with a situation wherein a dog or other animal will chase the rider nipping at the rider's legs. The rider is forced to react in a manner to avoid such attack resulting in an accident and injury to the rider. The rider might avoid such accidents if the rider was without fear of leg exposure.

Previously, leg shields have been made for motorcycles, an example of which is described in U.S. Pat. No. 4,650,204. Heretofore, however, there is yet to be a leg shield which is readily attachable and detachable to a bike which protects the legs of the rider against dog attacks. Additionally, it is desirable that the legs of the rider should be protected against side impacts. It is also desirable that there be a leg shield which can act as a brace mechanism to prevent the bike from tipping over.

SUMMARY OF THE INVENTION

It is an object of the present invention to provide a detachable leg shield for use with a bike to protect legs against dog attacks.

It is another object of the present invention to provide a detachable leg shield device for a bike which protects the legs of the rider against side impacts.

It is a further object of the present invention to provide a detachable leg shield which acts as a brace to prevent the bike from tipping over.

Accordingly, the present invention is directed to a detachable leg shield for use with a bike, which includes: detachable leg shield for use with a bike, comprising a first frame member having a first end, a second end, and an intermediate portion, the first end and said second end extending laterally from the intermediate portion; means for detachably securing the first end of the first frame member to a front part of a frame of the bike, which includes means for biasing the first frame member generally laterally outwardly from the frame of the bike; and means for detentably attaching the second end of first fame member to a rear part of the frame of the bike.

In the preferred embodiment, the detachable leg shield is further characterized such that when the first end and the second end of the first frame member are attached to the bike frame, the intermediate portion is sufficiently laterally disposed of the bike frame to allow a rider of the bike to operate the bike without inhibition of the first frame member, and the first frame member provides a closure about the rider's leg and barrier to animal attacks. Additionally, the leg shield is characterized such that when the first end of the first frame member is attached to the bike frame and the second end of the first frame member is detached from the bike frame, the intermediate portion and the second end are angularly laterally disposed from the bike frame and the intermediate portion acts as a brace to prevent the bike from tipping over.

DETAILED DESCRIPTION OF THE PREFERRED EMBODIMENTS

Figure 2:
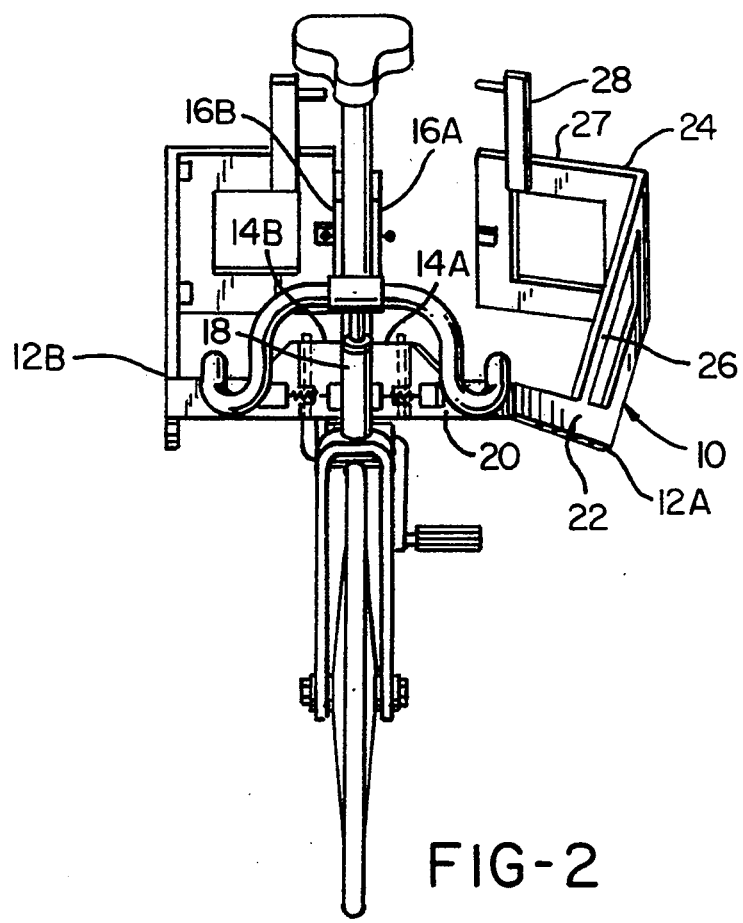
FIG. 2 is a front view of the present invention with the detachable leg shield attached at the front part of the bike frame.

Referring to the drawings, the detachable leg shield is generally designated by the numeral 10. As shown in FIG. 2, the shield 10 includes two frames 12A and 12B, means 14A and 14B for detachably connecting to the front frame of the bike 18 and means 16A and 16B for detentably connecting frames to the rear frame of the bike 18. The frames 12A and 12B reside on opposite sides of the bike 18 generally parallel to the frame of the bike 18. Since the shield 10 includes substantially symmetrical parts about the frame of the bike 18, only half of the structure will be discussed.

The frame 12 includes a front-end member 20, an intermediate portion 22 and a rear-end member 24. The intermediate portion 22 includes a panel frame-like portion 26. Likewise, the rear-end member 24 is formed with a panel frame-like member 27 and includes a handle 28 which extends upwardly from the member 27 and in manner to enable the rider to more readily swing the rear end member 24 of the frame 12 toward and away from the bike 18. The front-end member 20 and rear-end member 24 are of a length such that the intermediate portion 22 is sufficiently laterally disposed from the frame of the bike 18 to enable the rider to operate the bike 18.

Figure 1:
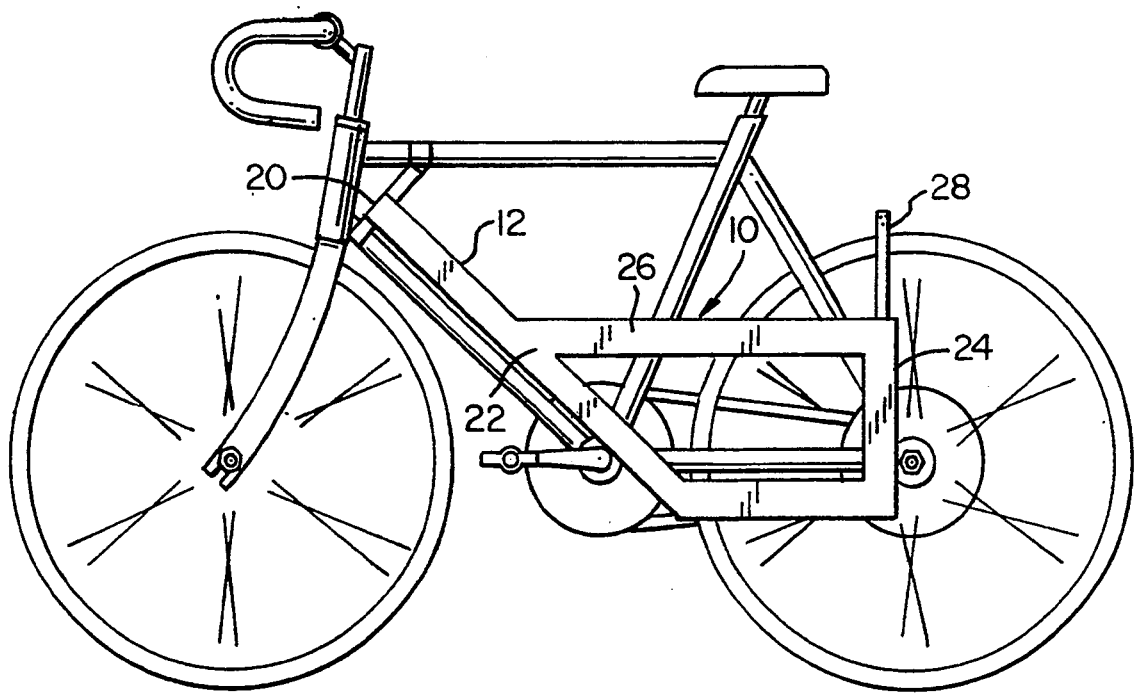
FIG. 1 is a side view of the present invention with the detachable leg shield attached to a bike.

The frame 12 can be constructed of any light weight rigid material such as plastic, alloy tubing, or wood. The frame 12 is generally constructed of a size and configuration as shown in FIG. 1 to form an enclosure about the rear lower portion of the leg. However, it is conceived by the inventor that other alternative embodiments may provide an equally suitable means for achieving the same result and are intended to be encompassed within the claims appended hereto. For example, rather than the rectangular-like configuration shown in the drawings, the frame 12 could take on an arcuate type configuration as would be done by a molding process. The overall size and configuration of the leg shield 10 would also be a function of the material chosen, i.e. a large enclosure may be formed with a large frame 12 without increasing the overall weight of the shield 10 by using a different material in which to form the shield 10.

Figure 3:
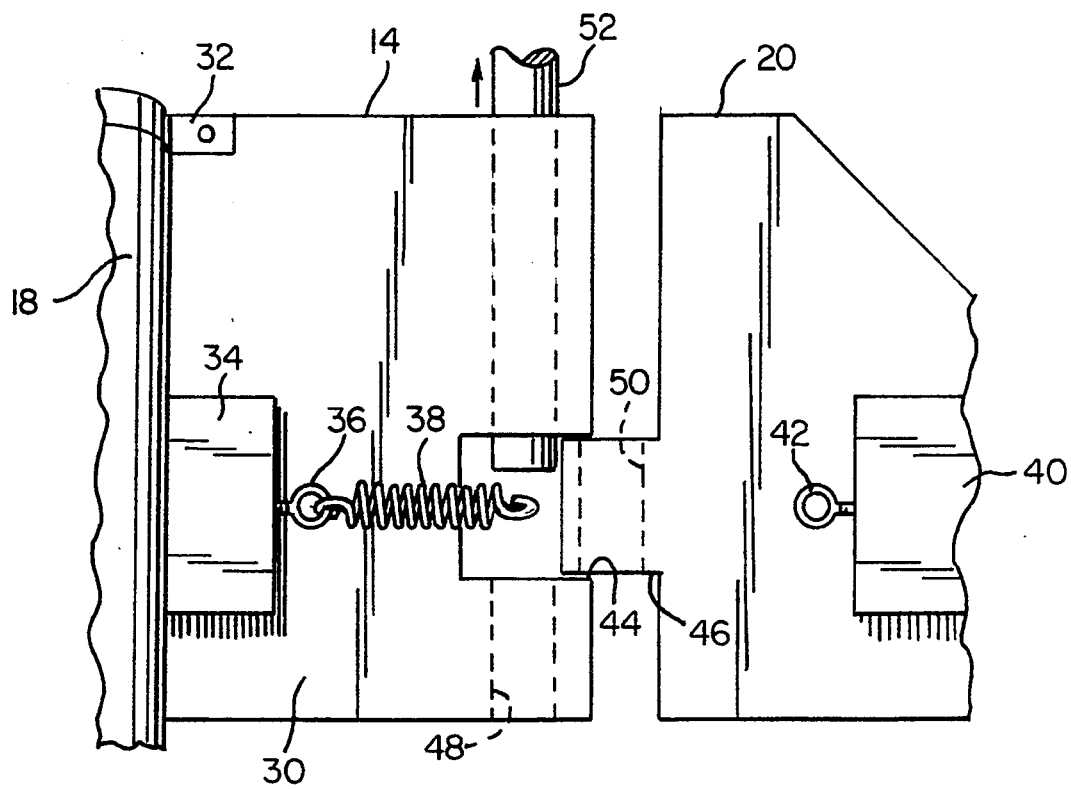
FIG. 3 is a cut away of the detachable connecting means of the present invention.

Referring to FIG. 3, means 14 for detachably connecting the front-end member 20 of the frame 12 are shown. The means 14 include a front frame connecting member 30 mounted to a front frame part of the bike 18 by U-clamps 32. Mounted to the front frame connecting member 30 is a support block 34. An eye-bolt 36 is threadably connected to the support block 34. A spring 38 is also provided with a predetermined force constant to be discussed hereinafter.

Front-end member 20, likewise, includes a support block 40, to which an eye-bolt 42 is threadably connected. The front frame connecting member 30 is configured with a female portion 44 to receive a male portion 46 of front-end member 20. Female portion 44 and male portion 46 both have a bored out surface portion 48 and 50, respectively, which receives a hinging pin 52 there against when male portion 46 is inserted into female portion 44. When so inserted, spring 38 is linked to eye-bolts 36 and 42 to complete the connection. The spring 38 is of a sufficient force constant to cause the frame 12 to swing generally laterally outwardly from the frame of the bike 18.

Figure 4:
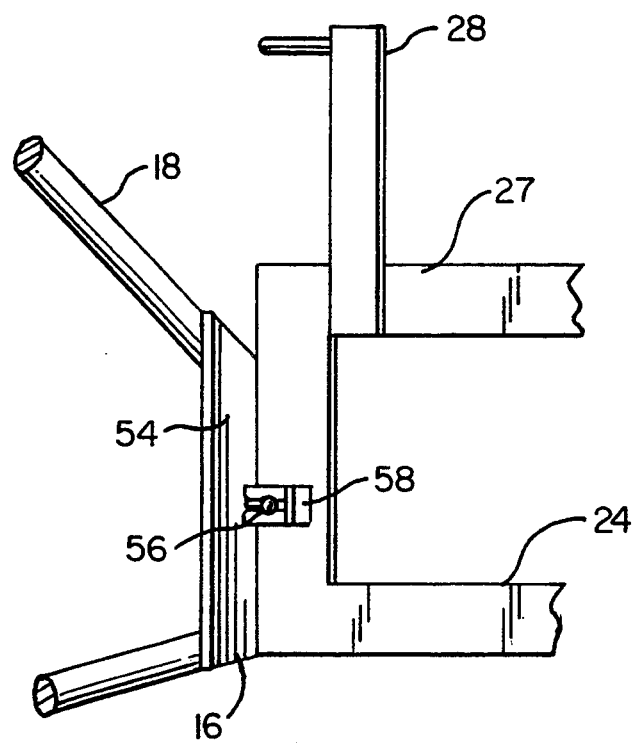
FIG. 4 shows the detent means for connecting the rear of the detachable leg shield to the rear part of the frame of the bike.

Referring to FIG. 4, means 16 for the detentably connecting the rear-end member 24 are shown. Means 16 include a securing plate 54 mounted to the rear part of the bike frame 18, a male detent portion 56 connected to the securing plate 54 and a female detent portion 58 connected to the rear-end member 24. The detent portions 56 and 58 are designed to overcome the force constant of spring 38 but readily disengagable by the rider prior to or during use. During riding, the bike may tip and begin to fall. When this occurs, the rider need simply to exert sufficient force to disengage the rear-end member 24 to cause the frame 12 to swing outwardly. The spring 38 will pull the rear end 24 of the frame 12 angularly outwardly and maintain the frame 12 in an open position. By design, the intermediate portion 22 remains in a kick stand-like manner and used as a brace to help bike 18 from falling. Thus, a safety device is provided. While not shown, it is contemplated that the rear-end member 24 can be hingedly connected to the intermediate portion 22 to ease mounting access by the rider.

While the present invention has been set-forth above in the preferred embodiments, it is contemplated that other modifications, derivations and improvements fall within the scope of the present invention. The invention therefore is entitled to protection of the embodiments disclosed above and to other such obvious modifications.

What is claimed is:

1. A detachable leg shield for use with a bike, comprising:

a first frame member having a first end, a second end, and an intermediate portion, said first end and said second end extending generally laterally from said intermediate portion;

means for detachably securing said first end of said first frame member to a front part of a frame of the bike, which includes means for biasing said first frame member generally laterally outwardly from the frame of the bike; and means for detentably attaching said second end of said first frame member to a rear part of the frame of the bike.

2. The detachable leg shield of claim 1, wherein when said first end and said second end of said first frame member are attached to the bike frame, said intermediate portion is sufficiently laterally disposed of the bike frame to allow a rider of the bike to operate the bike, and said first frame member provides a closure about the rider's leg and barrier to animal attacks.

3. The detachable leg shield of claim 1, wherein when said first end of said first frame member is attached to the bike frame and said second end of said first frame member is detached from said bike frame, said intermediate portion and said second end are angularly laterally disposed from said bike frame and said intermediate portion acts as a brace to prevent the bike from tipping over.

4. The detachable leg shield of claim 1, wherein said second end is hingedly connected to said intermediate portion to permit said second end to swing out of the way of the rider and enable relatively easy mounting access on the bike frame.

5. The detachable leg shield of claim 1, wherein said first frame member further includes a handle extending outwardly from the second end of said first frame member in a manner to readily enable a rider of the bike to attach and detach said second end of said first frame member to the bike frame.

6. The detachable leg shield of claim 1, further comprising:

a second frame member having a first end, a second end, and an intermediate portion, said first end and said second end extending laterally from said intermediate portion;

means for detachably securing said first end of said second frame member to a front part of the frame of the bike, which includes means for biasing said second frame member generally laterally outwardly from the frame of the bike; and means for detentably attaching said second end of second frame member to a rear part of the frame of the bike.

7. The detachable leg shield of claim 6, wherein when said first end and said second end of said second frame member are attached to the bike frame, said intermediate portion is sufficiently laterally disposed of the bike frame to allow a rider of the bike to operate the bike, and said second frame member provides a closure about the rider's other leg and barrier to animal attacks.

8. The detachable leg shield of claim 6, wherein when said first end of said second frame member is attached to the bike frame and said second end of said second frame member is detached from said bike frame, said intermediate portion and said second end are angularly laterally disposed from said bike frame and said intermediate portion acts as a brace to prevent the bike from tipping over.

9. The detachable leg shield of claim 6, wherein said second end is hingedly connected to said intermediate portion to permit said second end to swing out of the way of the rider and enable relatively easy mounting access on the bike frame.

10. The detachable leg shield of claim 6, wherein said second frame member further includes a handle extending outwardly from the second end of said second frame member in a manner too readily enable a rider of the bike to attach and detach second end of said second frame member to the bike frame.

11. A detachable leg shield for use with a bike, comprising:

a first frame member having a first end, a second end, and an intermediate portion, said first end and said second end extending generally laterally from said intermediate portion;

means for detachably securing said first end of said first frame member to a front part of a frame of the bike, which includes means for biasing said first frame member generally laterally outwardly from the frame of the bike;

means for detentably attaching said second end of said first frame member to a rear part of the frame of the bike;

a second frame member having a first end, a second end, and an intermediate portion, said first end and said second end extending laterally from said intermediate portion;

means for detachably securing said first end of said second frame member to another front part of the frame of the bike, which includes means for biasing said second frame member generally laterally outwardly from the frame of the bike; and means for detentably attaching said second end of second frame member to a rear part of the frame of the bike; and wherein when said first end and said second end of said first frame member and said second frame member are attached to the bike frame, said intermediate portion is sufficiently laterally disposed of the bike frame to allow a rider of the bike to operate the bike and said first frame member and said second frame member provide a closure about the rider's legs and barrier to animal attacks.

12. A detachable leg shield for use with a bike, comprising:

a first frame member having a first end, a second end, and an intermediate portion;

means for pivotally securing said first end of said first frame member to a front part of the frame of the bike;

means for releasably connecting said second end of said first frame member to a rear part of the frame of the bike;

a second frame member having a first end, a second end, and an intermediate portion;

means for pivotally securing said first end of said second frame member to another front part of the frame of the bike;

means for releasably connecting said second end of said second frame member to a rear part of the frame of the bike;

wherein said frame members are configured such that said intermediate portions are generally laterally spaced from the bike; and means for biasing at least one of said frame members outwardly from the bike.

13. The detachable leg shield of claim 12, wherein said releasable connecting means are further characterized to include a detent mechanism.

* * * * *